UNITED STATES PATENT OFFICE.

ERASMUS HENRY NAYLOR, OF LONDON, ENGLAND.

PROCESS TO REGENERATE AND IMPROVE THE STRUCTURE OF LEAD ELECTRODES OF SECONDARY BATTERIES.

1,026,527.  Specification of Letters Patent.  Patented May 14, 1912.

No Drawing.  Application filed December 27, 1910. Serial No. 599,394.

*To all whom it may concern:*

Be it known that I, ERASMUS HENRY NAYLOR, a subject of the King of Great Britain, residing at 319 Cavendish road, Bedford Hill, London, England, have invented a certain new and useful Process to Regenerate and Improve the Structure of Lead Electrodes of Secondary Batteries; and I do hereby declare that the following is a full, clear, and exact description of the invention, which will enable others skilled in the art to which it appertains to make and use the same.

My invention consists of a process by which the structure of the active material of the electrodes of secondary batteries can be generally improved or by which worn electrodes can be renovated.

My process consists in treating the active material with a compound of sulfur and a halogen, which, penetrating the pores of the material, is uniformly assimilated throughout the mass, this assimilation causes the bulk of the material to expand so that the vacant spaces between the material and the grid, and also the interstices in the mass itself are filled up. I then eliminate the assimilated matter and form the plate in any usual manner.

According to one method of carrying out my process, the defective electrodes are thoroughly dried in any convenient manner, as by heating, and, if necessary, are brushed to remove any adhering matter. This portion of the process is unnecessary when new electrodes are under treatment. The electrodes are then immersed in a liquid or vaporous bath of sulfothionyl chlorid, (also known as monochlorid of sulfur) ($S_2 Cl_2$), which is energetically absorbed by the active material with generation of heat. The electrodes are then subjected to heat in an oven the temperature of which can be regulated not to exceed the melting point of the electrodes. The active material is then reduced electrolytically in a bath of dilute sulfuric acid. The plates are then removed from the bath and washed in water, when they can be formed in any usual manner.

Having now particularly described and ascertained the nature of my said invention and in what manner the same is to be performed, I declare that what I claim is:—

1. The herein described process of treating electrodes for secondary batteries which consists in subjecting an electrode to the action of a compound of sulfur and a halogen.

2. The herein described process of treating electrodes for secondary batteries, which consists in subjecting an electrode to the action of a compound of sulfur and a halogen and then treating the electrode.

3. The herein described process of treating electrodes for secondary batteries, which consists in subjecting an electrode to the action of a compound of sulfur and a halogen, then heating the electrode, and then treating it with a bath of acid.

4. The herein described process of treating electrodes for secondary batteries which consists in subjecting an electrode to the action of sulfothionyl chlorid.

5. The herein described process of treating electrodes for secondary batteries which consists in subjecting an electrode to the action of sulfothionyl chlorid, heating the electrode, treating it with acid, washing the electrode and then forming it.

London 13th December, 1910.

ERASMUS HENRY NAYLOR.

Witnesses:
JOHN E. BOUSFIELD,
C. G. REDFERN.